United States Patent [19]

Hendrischk et al.

[11] Patent Number: 5,050,048
[45] Date of Patent: Sep. 17, 1991

[54] HEADLIGHT FOR VEHICLES

[75] Inventors: Wolfgang Hendrischk, Soest; Reiner Jocher, Aidlingen, both of Fed. Rep. of Germany

[73] Assignee: Hella KG Hueck & Co., Fed. Rep. of Germany

[21] Appl. No.: 557,646

[22] Filed: Jul. 25, 1990

[30] Foreign Application Priority Data

Sep. 13, 1989 [DE] Fed. Rep. of Germany ... 8910911[U]

[51] Int. Cl.$^5$ .............................................. B60Q 1/00
[52] U.S. Cl. ..................................... 362/61; 362/269; 362/277; 362/285; 362/418
[58] Field of Search ................... 362/61, 80, 418, 420, 362/421, 422, 424, 426, 427, 428, 430, 269, 277, 285

[56] References Cited

U.S. PATENT DOCUMENTS

| 4,794,495 | 12/1988 | McMahan et al. | 362/424 |
| 4,802,067 | 1/1989 | Ryder et al. | 362/61 |
| 4,901,208 | 2/1990 | DePetro | 362/424 |
| 4,916,583 | 4/1990 | Nagasawa | 362/61 |

FOREIGN PATENT DOCUMENTS 1472516  2/1969  Fed. Rep. of Germany.

Primary Examiner—Ira S. Lazarus
Assistant Examiner—Sue Hagarman
Attorney, Agent, or Firm—Griffin Branigan & Butler

[57] ABSTRACT

A headlight for vehicles in which a reflector (1) with an attached level (7) is adjustable about a horizontal axis within a stationary housing (2) includes a window-like opening arrangement as part of either a light shield for the housing, or the housing itself, with a transparent cover (5, 10) adjacent and above the level. The window-like opening arrangement can be part of a cap covering an opening into a rear-side wall of the housing and can include a magnifying glass.

8 Claims, 1 Drawing Sheet

HEADLIGHT FOR VEHICLES

BACKGROUND OF THE INVENTION

This invention relates to headlights for vehicles and more particularly to such headlights in which reflectors together with attached levels are rotatable about horizontal axes for examining a reflector adjustment.

A level attached to the outside of a reflector described in German Offenlagungsschrieft 1472516, of a known headlight, can easily be damaged when the reflector is built into a vehicle chassis and/or when the reflector is adjusted. Also, with such a headlight, the reflector as well as the level can be easily soiled and exposed to spray water.

It is an object of this invention to provide a headlight in which a reflector, along with a carried level for checking the reflector's adjustment, are rotatable about a horizontal axis, with the reflector, as well as the level, being protected from dirt, spray water, and possible damage and with a view of the level being free for further examining adjustment of the reflector without assembling, or disassembling, headlight parts.

SUMMARY

The above objects of the invention are achieved according to principles of this invention by having a reflector with an attached level mounted in an interior of a fixed-position headlight housing, with the interior being encased, or covered, by a light shield attached to the housing, wherein the light shield or the housing includes a window-opening arrangement sealed against dirt and spray water with a transparent cover adjacent and above the level. In order to examine the adjustment of the reflector with such an arrangement, it is only necessary to open a vehicle's hood.

A particularly beneficial embodiment the window-like opening arrangement is as part of a housing cap which is releasably attached to a rear-side wall of the housing for covering an opening therein. Such a solution is particularly beneficial because the headlight can easily be selectively made to have or not have a window-like opening arrangement by simply exchanging housing caps. Also with this arrangement, the level is freely accessible by simply removing the housing cap. Such a housing cap is particularly cost effectively produced when it is made completely of a transparent material so as to provide a transparent cover. Beneficial embodiments of headlight details according to the invention are set forth in dependent patent claims.

Three embodiments of the invention are depicted in the drawings.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of invention in a clear manner.

Figures 1, 2:
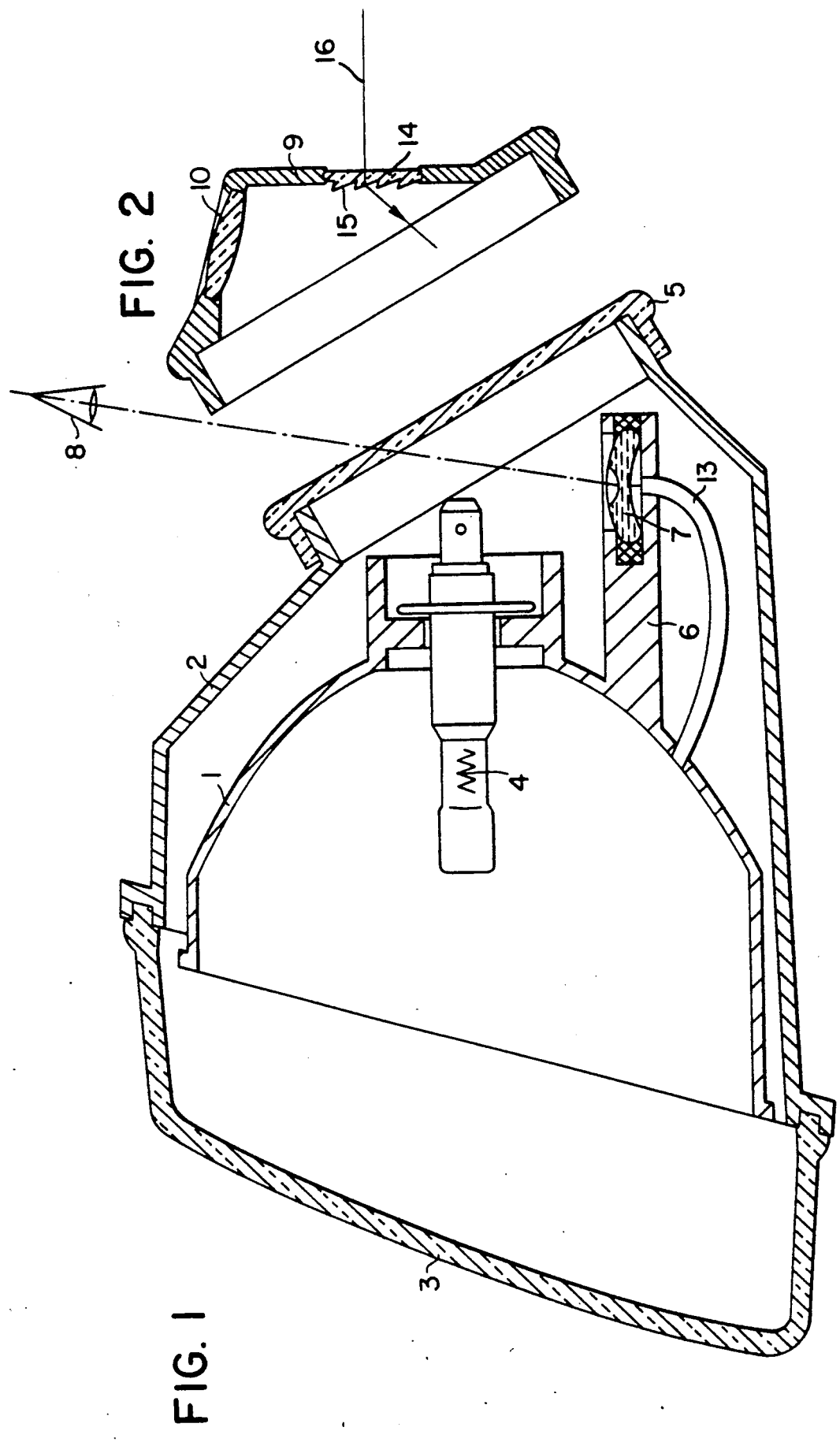
FIG. 1 is a middle, vertical, lengthwise, cross sectional view of a headlight housing with a housing cap on a rear side thereof according to principles of this invention.
FIG. 2 is a middle cross-sectional view of a housing cap with a window-like opening arrangement of this invention thereon.

A headlight according to FIGS. 1 and 2 primarily includes a reflector 1 constructed of resinous plastic and a housing 2 for rotatably receiving the reflector 1 in an interior thereof, with the interior of the housing 2 being covered by a light shield 3 attached to the housing 2. The reflector 1 has an opening at an apex for receiving a bulb 4. In order to change the bulb, a rear-side wall of the housing defines an opening at which a housing cap 5 of resinous plastic is releasably attached to the housing.

In FIG. 1, a protruding appendage 6 is formed on a rear side of the reflector 1 to which a level 7 is affixed. The housing cap 5 is constructed of transparent plastic. Thus, the headlight and the housing, have a window-like opening arrangement on a rear sidewall of the housing adjacent and above the level which includes a transparent cover, the housing cap 5. Thus, a line of sight from the vertical of an observer 8, as seen in FIGS. 1 and 2, checking, or examining, the reflector adjustment to the level 7 is free without the necessity of removing the housing cap.

In FIG. 2, a housing cap is depicted which is constructed of nontransparent resinous plastic but which has a window-like opening arrangement with a transparent cover 10. In this case, the cover 10 is a collective lens which enlarges the appearance of the level 7 for an observer.

It should be noted by those of ordinary skill in the art that a view of a level of this invention can be enhanced by outwardly directed light.

While the invention has been particularly shown and described with reference to preferred embodiments, it will be understood by those skilled in the art that various changes in form and detail may be made therein without departing from the spirit and scope of the invention. For example, it would be possible to further include a prism-like optical device on either an outer or an inner surface of the transparent cover. For example, a further window-like opening is shown in FIG. 2 which includes a transparent shield 14 mounted in an opening of the housing cap 9. Prismatic optical elements 15 form an inner surface of the shield 14 which direct light rays 16 to the level 7. In this manner, the level 7 is illuminated for observation when it is oriented sideways to the window-like opening. Also, it would be possible to include outwardly-leading light conductors to the level 7 for enhancing vision thereof. For example, one end of a light conductor 13 extends through an opening of the reflector 1 to a reflecting surface thereof and the other end extends through the protruding appendage 6 below the level 7 to bring light from the reflector to the level. A light conductor thusly mounted can transmit light rays falling into the headlight from outside, as well as those originating from the light bulb 4, to the level 7. Prism and light conductor elements could have other arrangements not shown in the drawings.

The embodiments of the invention in which an exclusive property or privilege are claimed or defined as follows:

1. In a headlight for a vehicle of a type having:
   a reflector mounted in an interior of a fixed-position housing which is enclosed at its front, in a light-exiting direction, by a light-transmitting shield and at its rear by a releasable housing cap;

the reflector being mounted to be pivotable about a horizontal axis;

a level affixed on the reflector for allowing observance of an orientation of the reflector;

the housing defining an opening thereinto above the level; and the opening being covered by a transparent cover; the improvement wherein:

the level is mounted on an end portion of a protrusion of the reflector extending toward the housing cap;

an edge of the housing defining the opening, which is covered by the housing cap, extends at such an angle to the horizontal that one can view into the interior of the housing therethrough from the vertical;

the end portion of the protrusion having the level mounted thereon extends sufficiently close to the housing opening that the level can be viewed therethrough from the vertical; and the housing cap is transparent in at least one portion thereof above the level.

2. In a headlight as in claim 1 wherein the opening covered by the transparent cover is in the housing cap.

3. In a headlight as in claim 1 wherein the entire housing cap is transparent.

4. In a headlight as in claim 1 wherein the level is arranged to be illuminated by light from an illuminating apparatus.

5. In a headlight as in claim 4 wherein the illuminating apparatus is mounted on the reflector of the housing.

6. In a headlight as in claim 4 wherein the illumination apparatus includes an opening in the reflector and a light bulb of the headlight is a light source of the illumination apparatus.

7. In a headlight as in claim 4 wherein the illuminating apparatus includes a light conductor through which the level is illuminated.

8. In a headlight as in claim 1 wherein the protrusion on which the level is mounted is formed below a light bulb of the headlight on a backside of the reflector.

* * * * *

UNITED STATES PATENT AND TRADEMARK OFFICE
CERTIFICATE OF CORRECTION

PATENT NO. : 5,050,048
DATED : September 17, 1991
INVENTOR(S) : Wolfgang Hendrischk and Reiner Jocher It is certified that error appears in the above-identified patent and that said Letters Patent is hereby corrected as shown below:

On the title page, change the listed Assignee to be --Hella KG Hueck & Co. and Mercedes-Benz AG, both of Fed. Rep. of Germany--.

Signed and Sealed this

Sixteenth Day of March, 1993

Attest:

STEPHEN G. KUNIN

*Attesting Officer*     *Acting Commissioner of Patents and Trademarks*